(12) United States Patent
Liu et al.

(10) Patent No.: US 11,455,401 B2
(45) Date of Patent: Sep. 27, 2022

(54) DATA-PROCESSING DEVICE AND DATA-PROTECTION METHOD THEREOF

(71) Applicant: Nuvoton Technology Corporation, Hsinchu Science Park (TW)

(72) Inventors: Ming-Ying Liu, Hsinchu (TW); Kun-Yi Wu, Tainan (TW); Chun-Chi Chen, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 645 days.

(21) Appl. No.: 16/426,230

(22) Filed: May 30, 2019

(65) Prior Publication Data
US 2020/0089894 A1 Mar. 19, 2020

(30) Foreign Application Priority Data
Sep. 18, 2018 (TW) ................. 107132757

(51) Int. Cl.
*G06F 21/60* (2013.01)
*G06F 21/75* (2013.01)
*G06F 3/06* (2006.01)

(52) U.S. Cl.
CPC ............ *G06F 21/60* (2013.01); *G06F 3/0622* (2013.01); *G06F 3/0631* (2013.01); *G06F 3/0659* (2013.01); *G06F 3/0679* (2013.01); *G06F 21/755* (2017.08)

(58) Field of Classification Search
CPC ...... G06F 21/60; G06F 21/755; G06F 3/0622; G06F 3/0631; G06F 3/0659; G06F 3/0679
See application file for complete search history.

(56) References Cited

U.S. PATENT DOCUMENTS

| 8,842,472 | B2 | 9/2014 | Kim | |
|---|---|---|---|---|
| 2009/0187697 | A1 | 7/2009 | Serebrin | |
| 2009/0210644 | A1* | 8/2009 | Batifoulier | G06F 12/1441 |
| | | | | 711/163 |
| 2014/0281137 | A1* | 9/2014 | Circello | G06F 12/1425 |
| | | | | 711/103 |
| 2016/0188492 | A1* | 6/2016 | Bachwani | G06F 12/14 |
| | | | | 711/6 |

FOREIGN PATENT DOCUMENTS

| CN | 102184360 B | 6/2013 |
|---|---|---|
| CN | 103608866 A | 2/2014 |
| TW | 201539467 A | 10/2015 |
| TW | I506431 B | 11/2015 |
| TW | 201702884 A | 1/2017 |
| TW | 201821998 A | 6/2018 |

* cited by examiner

*Primary Examiner* — Hee K Song
(74) *Attorney, Agent, or Firm* — Muncy, Geissler, Olds & Lowe, P.C.

(57) ABSTRACT

A data-processing device is provided. The data-processing device includes: a flash memory, a computation unit, and a flash-memory controller. The flash-memory controller is electrically connected to the computation unit, and configured to control access to the flash memory. The flash-memory controller allocates a first execute-only memory (XOM) setting and a second XOM setting in a first memory bank and a second memory bank of the flash memory, respectively. The flash-memory controller allocates one or more XOM spaces in the flash memory according to the first XOM setting or the second XOM setting.

20 Claims, 5 Drawing Sheets

DATA-PROCESSING DEVICE AND DATA-PROTECTION METHOD THEREOF

CROSS REFERENCE TO RELATED APPLICATIONS

This Application claims priority of Taiwan Patent Application No. 107132757, filed on Sep. 18, 2018, the entirety of which is incorporated by reference herein.

BACKGROUND OF THE INVENTION

Field of the Invention

The invention relates to techniques for protecting program codes and, in particular, to a data-processing device and a data-protection method thereof.

Description of the Related Art

Devices with security protection must protect the content stored therein from being maliciously copied or modified. When the protected content is program codes, the device with security protection must protect the program codes from being accessed and copied by non-owners and other unauthorized persons. Accordingly, a data-processing device and a data-protection method of the data-processing device are provided in the embodiments of the present invention.

BRIEF SUMMARY OF THE INVENTION

A detailed description is given in the following embodiments with reference to the accompanying drawings.

In an exemplary embodiment, a data-processing device is provided. The data-processing device includes: a flash memory, a computation unit, and a flash-memory controller. The flash-memory controller is electrically connected to the computation unit, and configured to control access to the flash memory. The flash-memory controller allocates a first execute-only memory (XOM) setting and a second XOM setting in a first memory bank and a second memory bank of the flash memory, respectively. The flash-memory controller allocates one or more XOM spaces in the flash memory according to the first XOM setting or the second XOM setting.

In another exemplary embodiment, a data-protection method for use in a data-processing device is provided. The data-processing device includes a flash memory, a computation unit, and a flash-memory controller. The method includes the steps of: allocating a first execute-only memory (XOM) setting and a second XOM setting in a first memory bank and a second memory bank of the flash memory, respectively; and allocating one or more XOM spaces in the flash memory according to the first XOM setting or the second XOM setting.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1A:
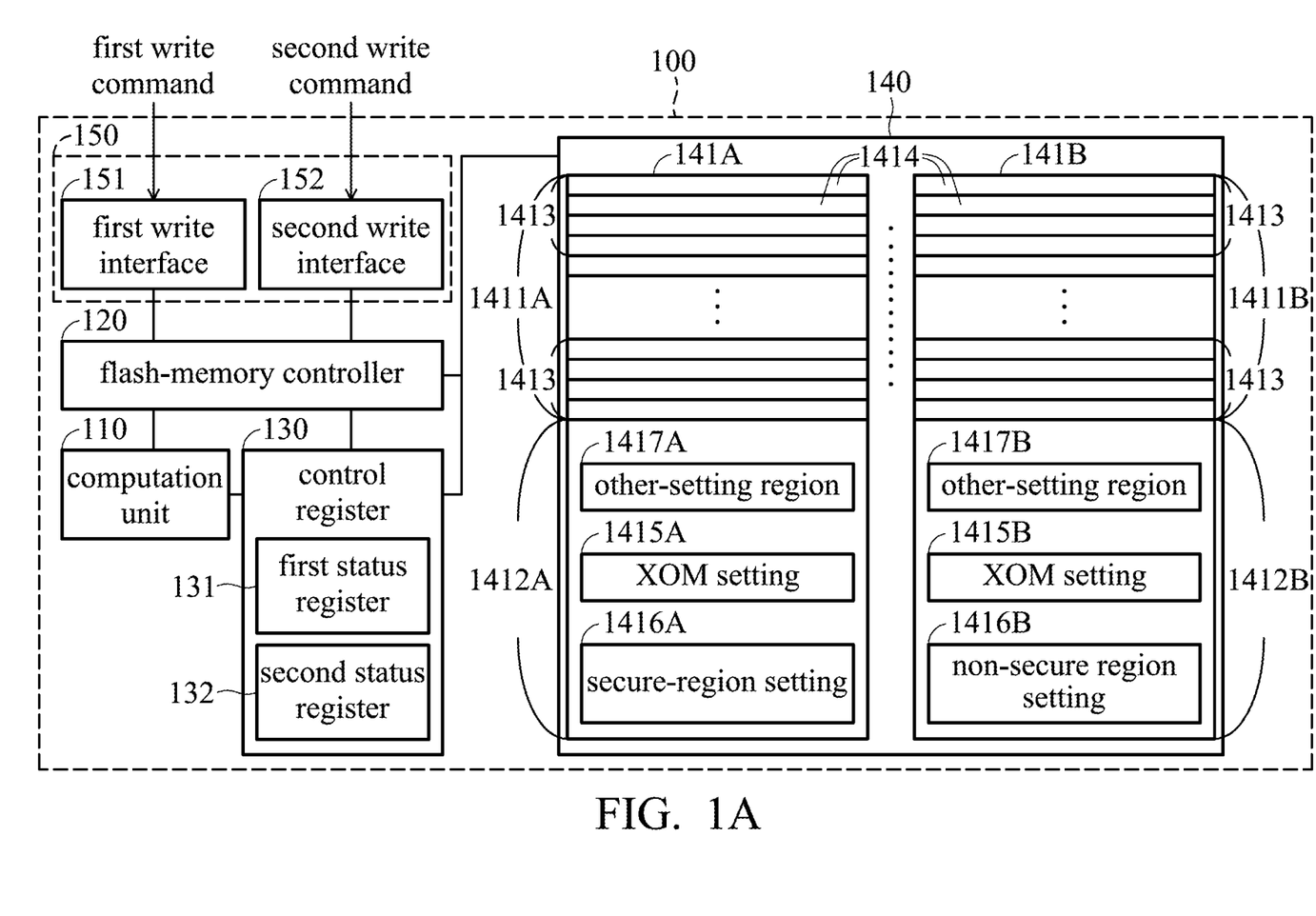
FIG. 1A is a system block diagram of a data-processing device in accordance with an embodiment of the invention.
Figure 1B:
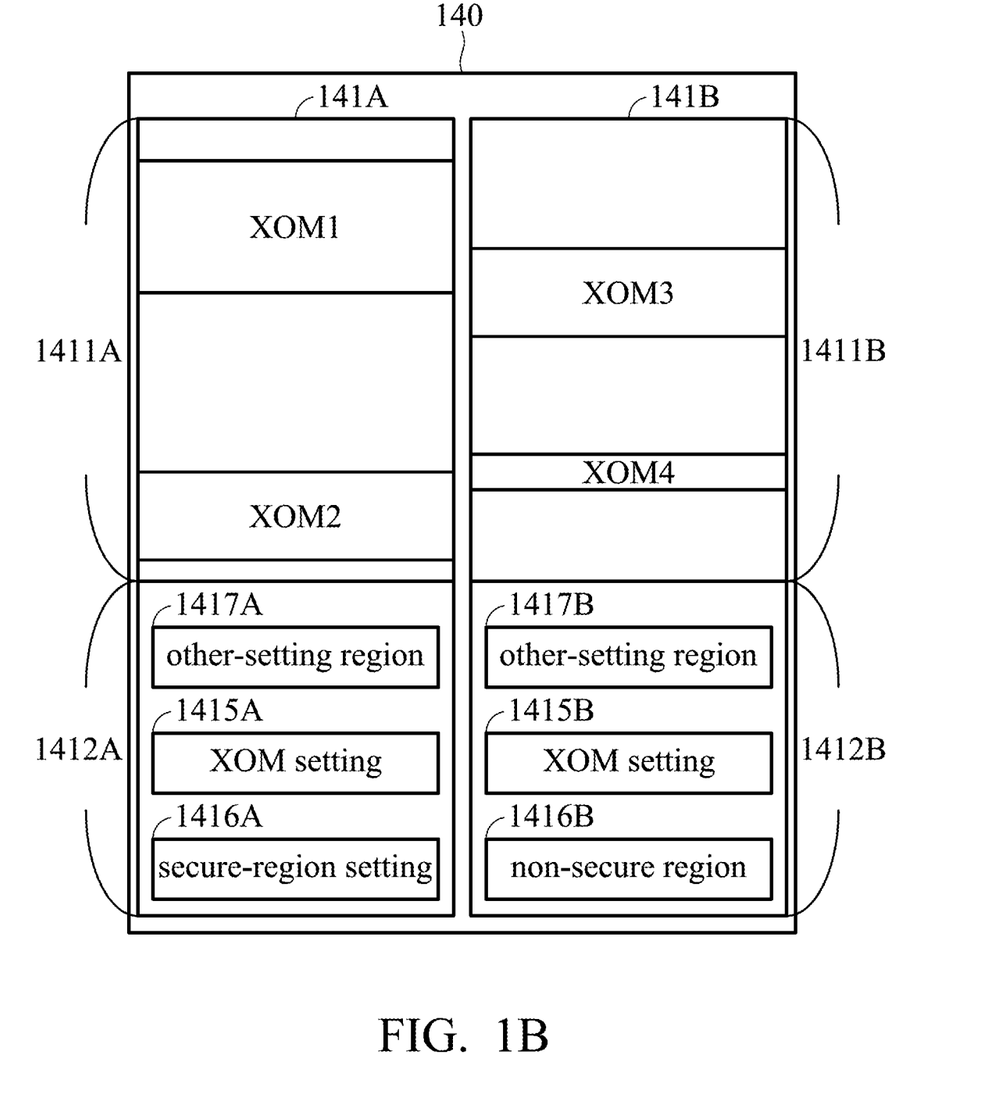
FIG. 1B is a diagram of allocation of execute-only memory spaces in accordance with the embodiment of FIG. 1A.

FIG. 1A is a system block diagram of a data-processing device in accordance with an embodiment of the invention. FIG. 1B is a diagram of allocation of execute-only memory spaces in accordance with the embodiment of FIG. 1A.

In an embodiment, the data-processing device 100 includes a computation unit 110, a flash-memory controller 120, a control register 130, a flash memory 140, and a data-writing interface 150. The computation unit 110 may be a central processing unit (CPU), a general-purpose processor, etc. The computation unit 110 is configured to execute program codes stored in the flash memory 140 to perform corresponding operations and controls.

In an embodiment, the flash-memory controller 120 is electrically connected to the computation unit 110, and configured to control access to the flash memory 140. The flash memory 140 is a non-volatile memory, and the data stored in the flash memory 140 will not disappear due to power failure. For example, the flash-memory controller 120 includes a flash translation layer (FTL) that is used to translate logical addresses of write, read, or erase commands into corresponding physical addresses in the flash memory 140, and perform corresponding operations on pages or data blocks in the flash memory 140 according to the translated physical addresses.

The following embodiments are described using the flash memory. However, other non-volatile memories can be used, such as an erasable programmable read-only memory (EPROM), a programmable read-only memory (PROM), a read-only memory (ROM), an electrically-erasable programmable read-only memory (EEPROM), etc. Accordingly, the flash-memory controller 120 mentioned in the following embodiments can be replaced with a non-volatile memory controller for controlling the non-volatile memory.

The flash memory 140 is divided into memory banks 141A and 141B. The memory bank 141A includes a data region 1411A and an information region 1412A, and the memory bank 141B includes a data region 1411B and an information region 1412B. The data regions 1411A and 1411B are configured to store program codes or data, wherein each of the data regions 1411A and 1411B includes a plurality of data blocks 1413, and each of the data blocks 1413 includes a plurality of pages 1414.

The information region 1412A includes an execute-only memory (XOM) setting 1415A, a secure-region setting 1416A, and an other-setting area 1417A. The information region 1412B includes an XOM setting 1415B, a non-secure-region setting 1416B, and an other-setting area 1417B. In an embodiment, the size of each of the XOM settings 1415A and 1415B, the secure-region setting 1416A, and the non-secure-region setting 1416B may be a page, but the invention is not limited thereto.

The XOM settings 1415A and 1415B are configured to store settings about a base logical address (or a start logical address), size (e.g., number of pages) or end logical address, and control bits of each of the XOM spaces XOM0~XOM3. The allocation of the XOM spaces XOM0~XOM3 in the flash memory 140 is shown in FIG. 1B. It should be noted that the number of XOM spaces can be adjusted according to practical conditions in the present invention, and at least one XOM space is supported.

When the control bits are equal to a specific address or value, the XOM space corresponding to the control bits will be deactivated. In addition, each of the XOM spaces XOM0~XOM3 can be allocated with a different size.

Figure 2:
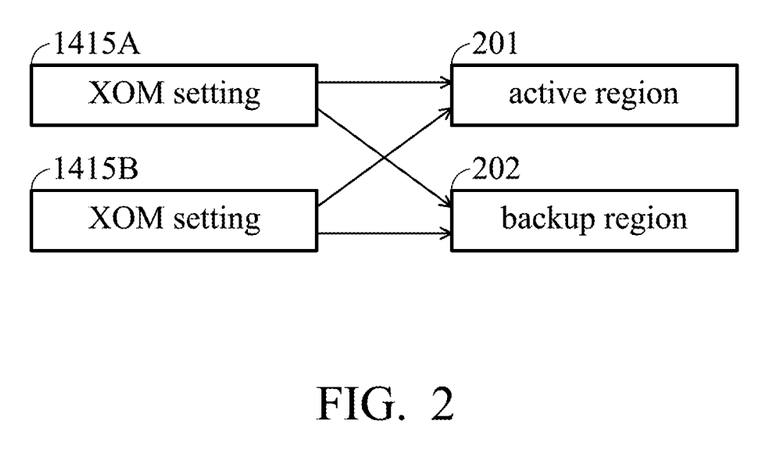
FIG. 2 is a diagram of the active region and backup region in accordance with an embodiment of the invention.

For example, the flash-memory controller 120 may set the XOM spaces XOM0~XOM3 according to one of the XOM settings 1415A and 1415B, and one of the XOM settings 1415A and 1415B is used as an active region, and the other of the XOM settings 1415A and 1415B is used as a backup region, as shown in FIG. 2. When the data-processing device 100 is in an initial state or is just powered on, the flash-memory controller 120 may set one of the XOM settings 1415A and 1415B having more control settings as the active region. When the XOM settings 1415A is set as the active region, the XOM setting 1415B can be regarded as the backup region. Similarly, when the XOM settings 1415B is set as the active region, the XOM setting 1415A can be regarded as the backup region. Accordingly, based on the aforementioned design, the XOM spaces in the present invention can have the function of power attack protection, and the details will be described later.

In an embodiment, the number of XOM spaces may be 4, such as XOM spaces XOM0~XOM3, but the invention is not limited thereto. For example, each of the XOM spaces XOM0~XOM3 can have a 24-bit start logical address, and the size of each of the XOM spaces XOM0~XOM3 can be expressed by an 8-bit number to represent a number of physical pages from 1 to 255. Additionally, the control bits of each of the XOM spaces XOM0~XOM3 can also be expressed by another 8-bit number. If the base logical address and the size are page aligned, and the relationships between the addresses can be expressed by Table 1.

TABLE 1

| Logical Address | XOM0 | XOM1 | XOM2 | XOM3 |
|---|---|---|---|---|
| Base logical address | 0x20_0000 | 0x20_0010 | 0x20_0020 | 0x20_0030 |
| Size | 0x20_0004 | 0x20_0014 | 0x20_0024 | 0x20_0034 |
| Control Bits | 0x20_0008 | 0x20_0018 | 0x20_0028 | 0x20_0038 |

The secure-region setting 1416A is configured to store the setting of the secure region allocated within the flash memory 140, such as the start address and size of the allocated secure region. The non-secure-region setting 1416B is configured to store the setting of the non-secure region allocated within the flash memory 140, such as the start address and size of the allocated non-secure region. For example, the secure region may include a secure byte that may be the most significant bye, the least significant byte, or a byte at any address. If the secure byte in the secure region is set to a specific value such as "0xFF", it indicates that the secure region is in an open-access state. If the secure byte in the secure region is set to another value other than the specific value, it indicates that the secure region is in a protection state. The non-secure region in the flash memory 140 can be regarded as a common user-code region, and the data in the non-secure region is not protected by a specific byte.

In an embodiment, the XOM spaces XOM0~XOM3 can be allocated in the secure region or the non-secure region, and may across the memory banks 141A and 141B. Generally, the computation unit 110 cannot read, write, or erase data or program codes stored in the XOM spaces XOM0~XOM3, but the computation unit 110 may execute the program codes stored in the XOM spaces XOM0~XOM3 using a library or function call. When the data-processing device 100 is operating, the computation unit 110 or other write interfaces cannot modify the settings for the XOM spaces XOM0~XOM3, such as the settings stored in the XOM settings 1415A and 1415B.

In addition, after the XOM settings 1415A and/or 1415B have been set up, the location and size for each of the XOM spaces XOM0~XOM3 cannot be adjusted by programming. However, when a user wants to re-plan the location and size of each of the XOM spaces XOM0~XOM3, the user may send a mass-erase command to the flash-memory controller 120 using the computation unit 110 or the write interface 150 to clear all of the XOM spaces XOM0~XOM3. For example, the flash-memory controller 120 may support a special erase command to clear the designated one of the XOM spaces XOM0~XOM3, but the special erase command cannot clear the XOM settings 1415A and 1415B for the XOM spaces XOM0~XOM3.

Specifically, the non-secure code has to call a secure application programming interface (API) to send the special erase command to the flash-memory controller 120 to clear all or the designated one of XOM spaces XOM0~XOM3, wherein the special erase command has a particular command-type address (e.g., indicating a page-erase command of the flash memory 140), a particular data address (e.g., the number of pages to be cleared), and a designated address (e.g., the base logical address of the XOM space to be erased). When all data of the designated XOM space has been erased, the flash-memory controller 120 may then erase either the XOM setting 1415A or the XOM setting 1415B (i.e., the XOM setting for the active region) corresponding to the designated XOM. If a particular XOM space is across the memory banks 141A and 141B, the data-erase operation will be divided into a plurality of page-erase commands in different memory banks.

In some embodiments, the control register 130 may include a first status register 131 and a plurality of second status registers 132. The first status register 131 is configured to indicate whether the XOM spaces XOM0~XOM3 are active and whether there are page-erase faults (e.g., a dirty bit corresponding to the XOM settings 1415A or 1415B). Each of the second status registers 132 is configured to record the page-aligned base logical address and size of each of the XOM spaces XOM0~XOM3.

In an embodiment, the data-processing device 100 can be integrated into various products such as communications products, TVs, storage devices, etc. For example, the XOM spaces XOM0~XOM3 may respectively store different program codes developed by different users in the same company or by different companies, but the invention is not limited thereto. When the flash memory 140 includes four XOM spaces XOM0~XOM3, and the same data-processing device 100 will be delivered to different companies or users one by one for product development. When the first company (or a first user in the first company) performs product development using the data-processing device 100, the first company (or the first user in the first company) may store the developed first core program code or first customized library in one of the XOM spaces such as the XOM space XOM0.

After the product development phase of the first company has completed, the data-processing device 100 is handed over to the second company (or a second user in the first company), and the second company may store the developed second core program code into another unused XOM space (e.g., XOM space XOM1), or into the secure region or non-secure region other than the XOM spaces XOM0~XOM3. For example, the second core program code may call the first customized library stored in the XOM space XOM0, and thus the product-development time for the second company can be reduced.

It should be noted that the XOM space is different from the secure region in the present invention. Although the secure region is a protected region to limit data access, the user is still capable of accessing the data or program code stored in the secure region by issuing a specific command and address via the computation unit 110 or write interface 150. However, the data, program code, and library stored in the XOM spaces XOM0~XOM3 are unable to be accessed. For example, when the XOM spaces XOM0~XOM3 in the aforementioned embodiment are set within the secure region, the second company (or the second user in the first company) may use the secure region by issuing a specific command via the computation unit 110, but the computation unit 110 is still not capable of accessing (i.e., including writing and reading) the first core program code and first customized library stored in the XOM space XOM0. That is, the second core program code developed by the second company (or the second user in the first company) should be executed to call the first customized library stored in the XOM space XOM0, or to execute the first core program code stored in the XOM space XOM0 via the computation unit 110.

In an embodiment, the write interface 150 of the data-processing device 100 may include one or more write interfaces such as a first write interface 151 and a second write interface 152, wherein the first write interface 151, for example, may support the parallel write interface, and the second write interface 152 may support the in-circuit programming (ICP) interface, but the invention is not limited thereto.

In an embodiment, the data and associated settings of the XOM spaces XOM0~XOM3 can be conditionally modified. For example, the user may issue an in-system programming (ISP) command via the computation unit 110, such as a page-erase command of the XOM space XOM0. Specifically, the type, data, and address of the ISP command should match particular conditions to distinguish the page-erase command of the XOM space 0 from the common flash-memory page-erase command which can be performed on the secure region and non-secure region other than the XOM spaces, so that the computation unit 110 determines that ISP command is a valid XOM-space page-erase command. For example, ISP command should match a particular command-type address (e.g., indicating a page-erase command of the flash memory), a particular data address (e.g., the number of pages to be cleared), and a designated address (e.g., the base logical address of the designated XOM space to be erased). If any of the aforementioned conditions does not match, the computation unit 110 may determine that the ISP command is an invalid command, and set a corresponding flag value (e.g., an ISP command fail flag, abbreviated as "ISPFF") to a specific value such as 0 or 1, thereby indicating the ISP command as an invalid command.

When the computation unit 110 determines that the ISP command is a valid command, the computation unit 110 may send the ISP command to the flash-memory controller 120, and the flash-memory controller 120 may perform corresponding operations in a state machine according to the ISP command, and the details of the state machine will be described in the embodiment of FIG. 3.

Figure 3:
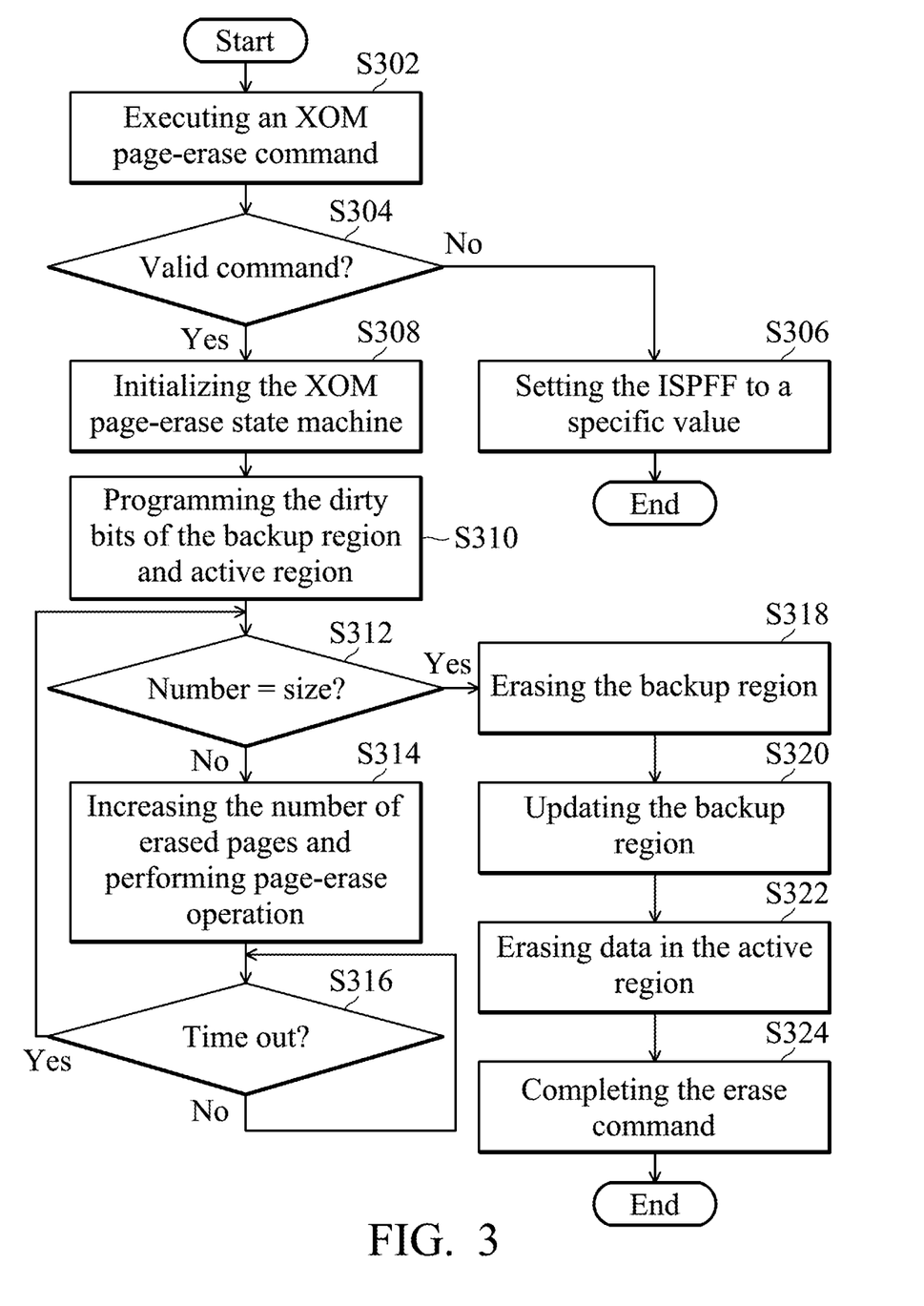
FIG. 3 is a diagram of the operation procedure of the data-processing device in accordance with an embodiment of the invention.

FIG. 3 is a diagram of the operation procedure of the data-processing device in accordance with an embodiment of the invention.

In step S302, an XOM page-erase command is executed. For example, the type, data, and address of the ISP command should match particular conditions in order to distinguish the page-erase command of the XOM space 0 from the common flash-memory page-erase command which can be performed on the secure region and non-secure region other than the XOM spaces.

In step S304, it is determined whether the XOM page-erase command is a valid command. For example, the computation unit may determine whether the XOM page-erase command match a particular command-type address (e.g., indicating a page-erase command of the flash memory), a particular data address (e.g., the number of pages to be cleared), and a designated address (e.g., the base logical address of the designated XOM space to be erased). If any of the aforementioned conditions does not match, the computation unit 110 may determine that the ISP command is an invalid command. If the determination result of step S304 is "Yes", step S308 is performed. If the determination result of step S304 is "No", step S306 is performed.

In step S306, the in-system programming command fail flag (ISPFF) is set as a specific value. For example, when the computation unit 110 determines that the XOM page-erase command is an invalid command, the computation unit 110 may set the corresponding ISPFF as a specific value such as 0 or 1, thereby indicating the XOM page-erase command being an invalid command.

In step S308, the XOM page-erase state machine is initialized. For example, when the computation unit 110 determines that the XOM page-erase command is a valid command, the flash-memory controller 120 may initialize the XOM page-erase state machine. That is, the XOM page-erase operations will follow the states of the XOM page-erase state machine.

In step S310, the dirty bits of the backup region and active region are programmed. For example, the flash-memory controller 120 may set the dirty bits of the backup region and active region as 1, to indicate that there is dirty information in the backup region and active region to prevent power attack in the subsequent states.

In step S312, it is determined whether the number of erased pages in the XOM space is equal to the size of the XOM space. If it is determined that the number of erased pages in the XOM space is equal to the size of the XOM space, step S318 is performed. If it is determined that the number of erased pages in the XOM space is not equal to the size of the XOM space, step S314 is performed. For example, when the data of the XOM space is to be erased, the erased data is counted in pages. When the number of erased pages is equal to the size of the XOM space (i.e., the number of pages in the XOM space), it is determined that the erase operation to the XOM space is completed.

In step S314, the number of erased pages is increased and page-erase (or block-erase) operation is performed. For example, upon performing step S314, it indicates that there are still pages in the XOM space have not been erased, and thus the page-erase operations should be continuously performed on the pages that have not been erased in the XOM space. For example, in an embodiment, some flash memories may support the function of block erase depending on the manufacturing process of the flash memory 140, and it indicates that multiple pages in a data block can be erased at one time. In addition, some flash memories may only support the function of page erase. In step S314, the flash-memory controller 120 may erase the pages in the XOM space using the fastest way. If a data block includes N pages, and the number of erased pages will increase by N after a block-erase operation. If a page-erase operation is performed, the number of erased pages will increase by 1.

In step S316, it is determined whether the erase operation has timed out. For example, depending on the manufacturing process of the flash memory 140, the flash-memory controller 120 may determine whether each erase operation (e.g., it may be a block-erase or page-erase operation) has timed out, wherein the time threshold for determining the time-out condition should match the block-erase time or page-erase time defined by the manufacturer of the flash memory 140. If the erase operation has timed out, step S312 is performed. If the erase operation has not timed out, step S316 is performed again to continue the erase operation.

In step S318, the backup region is erased. For example, in response to the backup region being erased, the backup region can be used to store new XOM setting.

In step S320, the backup region is updated. For example, the user may update the new setting of the XOM space that needs to be protected into the backup region after the resetting of the data-processing device 100.

In step S322, the content of the active region is erased. For example, the erase operation in step S322 is to clear the XOM setting 1415A or 1415B for the active region rather than clear the content of the control register 130. After the data-processing device 100 is reset, the flash-memory controller 120 may load the content of the XOM setting 1415A or 1415B for the active region into the control register 130, and the computation unit 110 may obtain the current setting of the XOM spaces according to the content of the control register 130.

In step S324, the erase command is completed. For example, in response to completion of the erase command, the computation unit 110 may issue a notification or a prompt that the XOM space has been erased and the setting of the XOM space is updated. It should be noted that, in response to completion of step S324, the flash-memory controller 120 may swap the current active region and backup region. That is, the updated setting for the backup region in step S320 may be used as the setting for the active region after the data-processing device 100 is reset, and the updated XOM setting will be loaded into the control register 130, thereby allocating corresponding XOM spaces in the flash memory 140.

Steps S308-S324 can be regarded as states in the state machine performed by the flash-memory controller 120 to adjust the XOM spaces. For example, the data and associated setting of the current XOM spaces should be erased first, and then the new XOM setting is updated to the backup region. When the data-processing device 100 is reset, the previous backup region is swapped to the active region, and thus the updated XOM setting can be used to allocate corresponding XOM spaces in the flash memory 140.

In addition, it should be noted that the dirty bits of the current active region and backup region are set to 1 in step S310. For example, when the dirty bit of the backup region is set to 1, a power attack at any of steps S318 to S320 can be prevented. When the dirty bit of the active region is set to 1, a power attack at step S322 can be defended. Specifically, a power attack may occur on the data-processing device 100 at any time. When the power attack occurs at a time outside the procedure for executing the state machine, the contents of the active region and backup region are prevented from being affected.

In an embodiment, the flash-memory controller 120 will not set the dirty bit of the backup region to 0 until the backup region has been updated in step S320, so that the dirty bit being 0 may indicate that the backup region is successfully updated. When the power attack occurs at a period from steps S318 to S320, it indicates that the backup region has not been updated yet, and the dirty bit of the backup region is still kept at 1. That is, when page-erase operations are performing on the XOM spaces and the data-processing device 100 encounters a power attack, the dirty bit of the backup region can be used to inform the flash-memory controller 120 and the computation unit 110 that there is a problem with the previous XOM page-erase operation that may cause errors to the content of the flash memory 140. When the data-processing device 100 is reset after encountering a power attack, the flash-memory controller 120 may load the content in the XOM settings 1415A and 1415B into the control register 130, so that the computation unit 110 may determine that the dirty bits of the current active region and backup region are 1 indicating that the data-processing device 100 has encountered a power attack. That is, the XOM setting of the current active region has not been modified or erased yet, and the flash-memory controller 120 may allocate corresponding XOM spaces in the flash memory 140 according to the XOM setting of the current active region.

In the embodiment, the flash-memory controller 120 may set the dirty bit of the active region as 0 after the active region is erased in step S322, thereby indicating that the current active region is successfully erased. If the power attach occurs during execution of step S322 in the state machine, it indicates that the current backup region has been updated, and thus the dirty of the backup region is 0, but the dirty bit of the current active region is still kept at 1. When the data-processing device 100 is rest after encountering a power attack, the flash-memory controller 120 may load the content in the XOM settings 1415A and 1415B into the control register 130. Thus, the computation unit 110 may determine that the dirty bit of the current active region is 1 and the dirty bit of the backup region is 0, thereby determining that the data-processing device 100 has encountered a power attack. That is, although the XOM setting of the current active region has not been modified or erased, the XOM setting of the backup region is successfully updated (i.e., its dirty bit is 0), and thus the flash-memory controller 120 may swap the current active region and backup region, and allocate XOM spaces in the flash memory 140 according to the XOM setting of the current active region after swapping. In addition, since the page-erase operation is performed on one of the memory banks 141A and 141B in the flash memory 140, the power attack cannot simultaneously affect both the XOM setting 1415A in the memory bank 141A and the XOM setting in the memory bank 1415B.

Accordingly, the XOM spaces in the flash memory may have the function of power attack protection using the aforementioned mechanism in the present invention.

Figure 4:
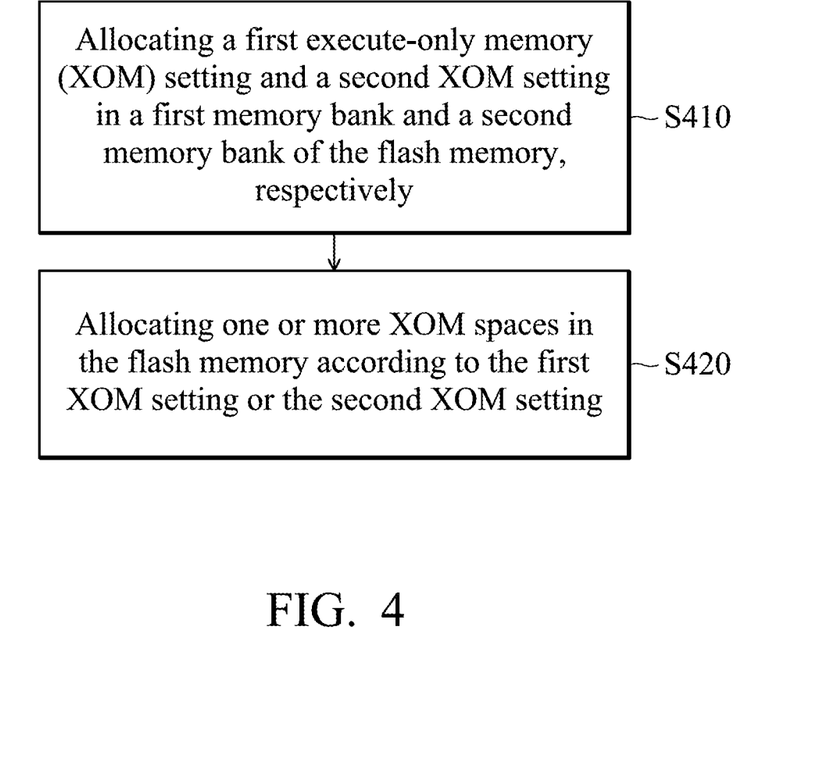
FIG. 4 is a flow chart of the data-protection method in accordance with an embodiment of the invention.

FIG. 4 is a flow chart of the data-protection method in accordance with an embodiment of the invention.

In step S410, a first XOM setting and a second XOM setting are allocated in a first memory bank and a second memory bank of the flash memory, respectively. For example, the first memory bank and the second memory bank are respectively the memory banks 141A and 141B, and the first XOM setting and the second XOM setting are respectively the XOM settings 1415A and 1415B.

In step S420, one or more XOM spaces are allocated in the flash memory according to the first XOM setting or the second XOM setting. For example, one of the first XOM setting and the second XOM setting is an active region, and the other of the first XOM setting and the second XOM setting is a backup region. When the data-processing device 100 is reset, the flash-memory controller 120 may compare the dirty bits of the active region and backup region to determine whether the data-processing device 100 has encountered a power attack. If it is determined that the data-processing device 100 does not encounter a power attack (i.e., the dirty bits of the active region and backup region are 0), the flash-memory controller 120 may load the XOM setting of the active region into the control register 130, and allocate one or more XOM space in the flash memory according to the content in the control register 130. If it is determined that the data-processing device 100 has encounter a power attack (i.e., any of the dirty bits of the active region and backup region is 1), the flash-memory controller 120 may determine to load the XOM setting in the active region or backup region according to the determination mechanism described in the embodiment of FIG. 3, and allocate one or more XOM spaces in the flash memory 140 according to the loaded XOM setting.

In view of the above, a data-processing device and a data-protection method thereof are provided. The data-processing device and the data-protection method are capable of storing an XOM setting in each memory bank in the flash memory 140, and allocating one or more XOM spaces in the flash memory 140 according to one of the XOM settings. When there are multiple XOM spaces in the flash memory 140, depending on the order of product development, the developer in the earlier order may store their program code into one or more XOM spaces to protect the core program code thereof. Since the function library and core program code stored in the XOM space can only be called and executed via the computation unit 110, and thus the developer in the later order cannot access the core program code stored in the XOM space designated by the developer in the earlier order, thereby achieving the function of protecting the design of the developer in the earlier order. In addition, the flash-memory controller 120 in the present invention may execute a state machine to adjust the settings of XOM spaces, so that the XOM spaces in the flash memory 140 may have the function of power attack protection using the design of the state machine.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A data-processing device, comprising:
   a flash memory;
   a computation unit; and
   a flash-memory controller, electrically connected to the computation unit, and configured to control access to the flash memory;
   wherein the flash-memory controller allocates a first execute-only memory (XOM) setting and a second XOM setting in a first memory bank and a second memory bank of the flash memory, respectively;
   wherein the flash-memory controller allocates one or more XOM spaces in the flash memory according to the first XOM setting or the second XOM setting.

2. The data-processing device as claimed in claim 1, wherein a program code or function library stored in the one or more XOM spaces is unable to be accessed by the computation unit, and the computation unit performs an application to call the program code or the function library stored in the one or more XOM spaces.

3. The data-processing device as claimed in claim 1, wherein the first XOM setting and the second XOM setting is unable to be modified when the data-processing device is operating.

4. The data-processing device as claimed in claim 1, wherein the computation unit determines, according to a specific command-type address, a specific data address, and a designated address of an in-system programming (ISP) command, whether the ISP command is a valid XOM page-erase command.

5. The data-processing device as claimed in claim 4, wherein in response to the computation unit determining that the ISP command is the valid XOM page-erase command, the flash-memory controller initializes and executes a state machine.

6. The data-processing device as claimed in claim 5, wherein one of the first XOM setting and the second XOM setting is an active region, and the other of the first XOM setting and the second XOM setting is a backup region, and the flash-memory controller respectively sets a first dirty bit of the first region and a second dirty bit of the backup region to first values.

7. The data-processing device as claimed in claim 6, wherein the flash-memory controller erases data stored in the one or more XOM spaces according to the XOM page-erase command,
   wherein after the data stored in the one or more XOM spaces has been erased, the flash-memory controller erases data stored in the backup region, and stores a new XOM setting into the backup region.

8. The data-processing device as claimed in claim 7, wherein in response to the update of the backup region being complete, the flash-memory controller updates the second dirty bit to a second value, and erases data stored in the active region,
   wherein after the data stored in the active region has been erased, the flash-memory controller updates the first dirty bit to the second value.

9. The data-processing device as claimed in claim 8, wherein after the data-processing device is reset, the flash-memory controller determines whether the data-processing device has encountered a power attack during execution of the XOM page-erase command according to the first dirty bit and the second dirty bit,
   when the flash-memory controller determines that the data-processing device has not encountered the power attack, the flash-memory controller allocates the one or more XOM spaces in the flash memory according to the XOM setting of the active region;

when the flash-memory controller determines that the data-processing device has encountered the power attack, the flash-memory controller determines, according to the first dirty bit and the second dirty bit, whether to use the XOM setting of the active region or the XOM setting of the backup region to allocate the one or more XOM spaces in the flash memory.

10. The data-processing device as claimed in claim 9, wherein when the flash-memory controller determines that the data-processing device has encountered the power attack, the flash-memory controller determines whether the first dirty bit and the second dirty bit are the first values or the second values, if the first dirty bit and the second dirty bit are the first values, the flash-memory controller allocates the one or more XOM spaces in the flash memory according to the XOM setting in the active region;

if the first dirty bit is the first value and the second dirty bit is the second value, the flash-memory controller swaps the active region and the backup region, and allocates the one or more XOM spaces in the flash memory according to the XOM setting in the active region after swapping.

11. A data-protection method, for use in a data-processing device, wherein the data-processing device comprises a flash memory, a computation unit, and a flash-memory controller, and the data-protection method comprises:

allocating a first execute-only memory (XOM) setting and a second XOM setting in a first memory bank and a second memory bank of the flash memory, respectively; and allocating one or more XOM spaces in the flash memory according to the first XOM setting or the second XOM setting.

12. The data-protection method as claimed in claim 11, wherein a program code or function library stored in the one or more XOM spaces cannot be accessed by the computation unit, and the computation unit performs an application to call the program code or the function library stored in the one or more XOM spaces.

13. The data-protection method as claimed in claim 11, wherein the first XOM setting and the second XOM setting cannot be modified when the data-processing device is operating.

14. The data-protection method as claimed in claim 11, further comprising:

determining, according to a specific command-type address, a specific data address, and a designated address of an in-system programming (ISP) command executed by the computation unit, whether the ISP command is a valid XOM page-erase command.

15. The data-protection method as claimed in claim 14, further comprising:

in response to determining that the ISP command is the valid XOM page-erase command, initializing and executing a state machine by the flash-memory controller.

16. The data-protection method as claimed in claim 15, wherein one of the first XOM setting and the second XOM setting is an active region, and the other of the first XOM setting and the second XOM setting is a backup region, and the method further comprises:

respectively setting a first dirty bit of the first region and a second dirty bit of the backup region as first values.

17. The data-protection method as claimed in claim 16, further comprising:

erasing data stored in the one or more XOM spaces according to the XOM page-erase command; and after the data stored in the one or more XOM spaces has been erased, erasing data stored in the backup region, and storing a new XOM setting into the backup region.

18. The data-protection method as claimed in claim 17, further comprising:

in response to the update of the backup region being complete, updating the second dirty bit to a second value, and erasing data stored in the active region; and after the data stored in the active region has been erased, updating the first dirty bit to the second value.

19. The data-protection method as claimed in claim 18, further comprising:

after the data-processing device is reset, determining whether the data-processing device has encountered a power attack during execution of the XOM page-erase command according to the first dirty bit and the second dirty bit;

when it is determined that the data-processing device has not encountered the power attack, allocating the one or more XOM spaces in the flash memory according to the XOM setting of the active region; and when it is determined that the data-processing device has encountered the power attack, determining, according to the first dirty bit and the second dirty bit, whether to use the XOM setting of the active region or the XOM setting of the backup region to allocate the one or more XOM spaces in the flash memory.

20. The data-protection method as claimed in claim 19, further comprising:

when it is determined that the data-processing device has encountered the power attack, determining whether the first dirty bit and the second dirty bit are the first value or the second value;

if the first dirty bit and the second dirty bit are the first value, allocating the one or more XOM spaces in the flash memory according to the XOM setting in the active region; and if the first dirty bit is the first value and the second dirty bit is the second value, swapping the active region and the backup region, and allocating the one or more XOM spaces in the flash memory according to the XOM setting in the active region after swapping.

* * * * *